May 16, 1933.    G. C. TROTTER    1,909,476
SELF TAPPING SCREW
Filed Nov. 28, 1931
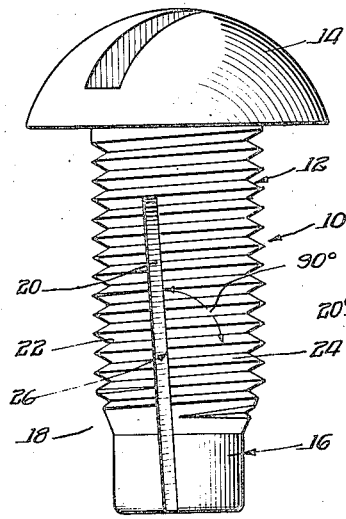
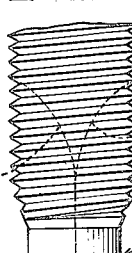
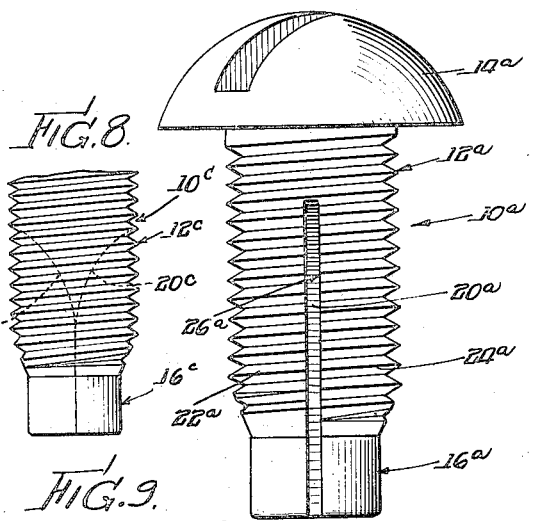
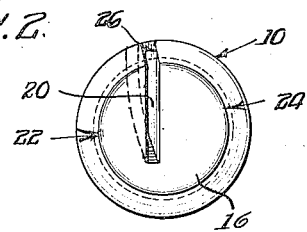
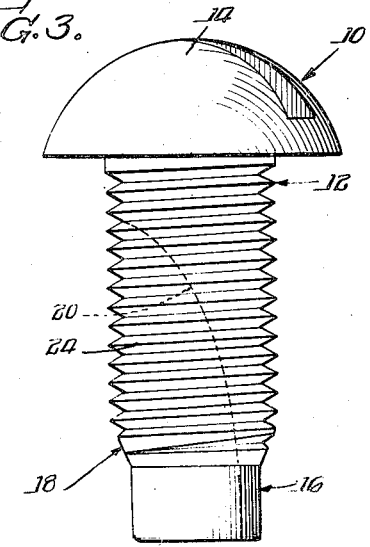
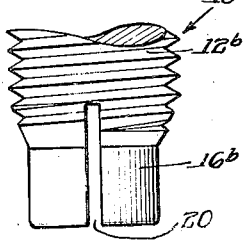
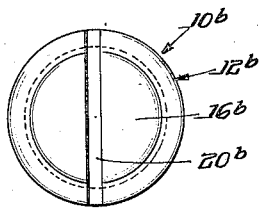
Inventor:
George C. Trotter,
By Cheever, Cox & Moore
attys.

Patented May 16, 1933

1,909,476

UNITED STATES PATENT OFFICE

GEORGE C. TROTTER, OF CHICAGO, ILLINOIS, ASSIGNOR TO SHAKEPROOF LOCK WASHER COMPANY, OF CHICAGO, ILLINOIS, A CORPORATION OF DELAWARE

SELF-TAPPING SCREW

Application filed November 28, 1931. Serial No. 577,743.

My invention relates generally to self-tapping screws, and more particularly to screws equipped with standard threads which are adapted to be tapped into hard materials, such as metals, "Bakelite", etc.

The invention disclosed in the present application is related to the invention set forth in my co-pending application, Serial No. 551,904, filed July 20, 1931, but presents certain structural features not disclosed in said co-pending application.

One of the primary objects of my invention is to provide a self-tapping screw having threads of conventional design, which is equipped with piloting means for expediting the insertion of the screw within an aperture of a work piece.

More specifically, my invention contemplates the provision of a screw which is longitudinally recessed and provided at its entering extremity with a reduced section or pilot, said pilot serving to guide the screw as it cuts its way within the work piece.

Still another object of my invention is to provide a screw, as above set forth, in which a section of the screw body including a portion of the pilot, is resilient, and hence adapted to yield when the screw is tightened within the work piece so as to facilitate the cutting action of the screw.

A further and more specific object of my invention is to provide a screw having a pilot at its entering end, as above set forth, which is formed with a recess extending longitudinally of the screw body in a direction substantially normal to the thread helix, whereby, when the screw is applied to a work piece, a section of the pilot and the screw body proper will yield without effecting any misalinement of the screw threads during the cutting operation.

The foregoing and numerous other objects and advantages will be more apparent from the following detailed description when considered in connection with the accompanying drawing, wherein—

Figure 1 is a side elevational view of a self-tapping screw representing one embodiment of my invention, said screw being provided with a longitudinal recess which is substantially perpendicular to the thread helix;

Figure 2 is a bottom view of the screw shown in Figure 1;

Figure 3 is a view taken from the right of Figure 1;

Figure 4 is a modified self-tapping screw equipped with a longitudinal recess which is substantially parallel to the screw axis;

Figure 5 is a bottom view of the screw shown in Figure 4;

Figure 6 is still another modified screw construction in which the entering end of the screw body is provided with a transverse slot;

Figure 7 is a bottom view of the screw structure shown in Figure 6; and

Figures 8 to 10 inclusive disclose still another modified screw construction.

Referring now to the drawing more in detail, wherein like numerals have been employed to designate similar parts throughout the various figures, it will be seen that one embodiment of my invention, as shown in Figures 1 to 3 inclusive, includes a screw designated generally by the numeral 10. This screw 10 includes a threaded body 12 having a head 14 at one end thereof and a pilot 16 extending from the opposite end thereof. The screw body 12 is cylindrical throughout its entire extent, and the threads thereof extend a uniform distance outwardly over substantially the entire length of the screw body. The threaded body 12 is slightly chamfered or beveled at 18, but the screw threads do not vary from their standard form except of course as they are affected by the presence of the cut-off or chamfered portion 18.

A recess or slot 20 extends longitudinally and partially across the screw body 12, and it will be noted that the plane of this slot is substantially perpendicular to the thread helix. The presence of the slot 20 divides the screw body 12 into a screw section 22 and a companion section 24. It will be seen from Figure 2 that the section 22 is smaller in cross section than the section 24. The pilot 16 is slightly less in diameter than the bottom diameter of the screw threads, and thus facilitates the entrance of the screw within the aperture of a work piece. As a rotary and forward force is applied to the screw head 14, the screw section 22 tends to yield inwardly, and a serrated cutting edge 26 of the section 24 cuts away the material of the work piece. Chips removed from the stock are received by the slot 20, and it will be apparent that the screw section 22 yields about an axis which is substantially normal to the plane of the thread helix. By having the section 22 yieldable in this manner, no misalinement of the threads in either of the sections 22 and 24 is experienced, thereby positively preventing any reaming effect. For a more detailed discussion and explanation of this particular disposition of the slot 20, reference is again made to my above mentioned co-pending application.

It will be apparent from the above description that the yielding of the screw section 22 occurs only during the initial application of the screw to the aperture of a work piece. In other words, after the threads have been cut in the work piece the screw section 22 and its companion pilot section automatically swing outwardly to their normal cylindrical position. The normal tendency of the screw section 22 to swing outwardly as the threads are cut within the work piece, sets up sufficient frictional resistance to counteract any tendency for the screw to loosen. It should also be noted that the threads formed by my improved screw are actually cut in the work piece, as distinguished from being forced or molded in the work piece. For this reason it is not necessary to provide a long or extended taper to the screw in order to force it into the aperture of the work piece. The threads of the screw are uniform in depth, with the possible exception of a fragmentary portion thereof cut away by the presence of the chamfer 18.

In Figures 4 and 5 I have disclosed a modified screw construction designated generally by the numeral 10a. This screw is provided with a longitudinal recess or slot 20a, which is substantially parallel to the axis of the screw, and hence is inclined with respect to the plane of the thread helix. Said screw also includes a head 14a, a screw body 12a made up of a pair of screw sections 22a and 24a, which are separated by the slot 20a, and a pilot 16a extending from the screw body 12a, said pilot being similar to the pilot 16 of the screw 10. It will be apparent that the screw sections 22a and 24a are substantially equal in cross section by reason of the fact that the slot 20a extends medially of the screw body. The threads within the screw section 22a, when they are sprung inwardly as a result of the initial engagement of said section with the work piece, will not maintain absolute alinement with the companion threads in the section 24a, as described in connection with Figures 1 to 3 inclusive. However the serrated cutting edge 26a of the screw section 24a will cut threads within the work piece with sufficient accuracy for certain types of work. That is to say, when the degree of accuracy capable of being accomplished by using the screw 10 is not required, a screw such as the screw 10a, may be employed. It should also be noted that the screw section 22a does not have as much resiliency as the screw section 22 because the screw section 22 is smaller in cross sectional area than the screw section 24, and therefore will more readily yield to pressure experienced during the initial application of the screw to the work.

Referring to Figures 6 and 7, it will be seen that I have disclosed a still further screw modification designated generally by the numeral 10b. This screw includes the usual threaded body 12b and a pilot 16b provided at the entering end thereof. A slot 20b completely traverses the entering extremity of the screw, but only extends into the screw body a short distance. In fact, the slot 20b only traverses a few of the threads in the screw body. For certain types of work a screw of the type shown in Figures 6 and 7 may be employed for cutting threads.

In Figures 8 to 10 inclusive I have shown still another screw modification designated generally by the numeral 10c, which comprises a screw body 12c having a pair of oppositely disposed longitudinally extending slots 20c, which are disposed in staggered relation transversely of said screw body, Figure 10. It will be seen that each of these slots 20c divides the screw body into a pair of screw sections 22c and 24c, the sections 22c being the advancing sections; and the sections 24c, the cutting sections. It will be seen that one wall of each of the slots 20c is radial, while the other wall is laterally displaced with respect to a radial plane. Thus each of the screw sections 22c at its entering point is less in cross sectional area than the companion section 24c. This relationship renders the screw sections 22c yieldable in response to the force acting thereon when the screw is applied to the unthreaded aperture of a work piece. It will also be seen that the entering extremity of the screw 10c conforms with the shape of conventional die pointed screws inasmuch as it includes a pilot member 16c, which merges with a chamfered or beveled portion 18c.

From the foregoing it will be apparent that my invention contemplates the provision of a self-tapping screw of simple and practical design. The threads, being of conventional design, further serve to simplify the screw structure, and the presence of the pilot in combination with the bifurcated screw sections serves to materially expedite the entrance or insertion of the screw within the aperture of a work piece. By having the screw body cylindrical over practically its entire axial extent, with the possible exception of the small chamfered or beveled portion 18, maximum strength is insured, and uniformity in the threads is maintained over substantially the entire length of the screw body. The pilot serves to direct the following screw threads in their cutting action upon the work piece. By having the slot or recess within the screw substantially perpendicular to the plane of the thread helix, no misalinement of the threads in the companion screw sections is experienced, and hence the possibility of reaming is eliminated. However, in instances where extreme accuracy in thread dimension is not required, recesses of the type disclosed in Figures 4 to 7 inclusive may be employed.

Attention is directed to the fact that my improved self-tapping screw is provided at its entering extremity with a shape which conforms generally with the shape of die pointed screws, and the chamfered or beveled portion which merges into the cylindrical pilot cuts away a certain portion of the screw threads, so that the portion of the threads included within the chamfer will be formed with a flat surface which corresponds to the flat surface provided in conventional tapered taps and the like. By employing this construction, the initial cutting of the work piece may be more easily performed. Again, I wish to urge that the action of my improved self-tapping screw should be clearly distinguished from conventional types of self-tapping devices of this general class, in which there is no yielding of a section of the screw, and in which the screw threads are forced rather than cut in the material. It should be apparent that self-tapping screws constructed in accordance with the teachings of my invention, are particularly adaptable for use in brittle materials, such as "Bakelite", slate, plaster of Paris, etc., wherein the threads must be cut and not merely forced into the material. Materials such as "Bakelite", slate, and plaster of Paris tend to crack or crumble when force is applied thereto, but are readily adapted to have threads cut therein, as, for example, by employing my improved thread cutting screw. Attention is again directed to the fact that by providing the longitudinal slot within the screw body and pilot, a passage for cuttings is presented which relieves against any tendency of crowding, thereby avoiding any undue pressure upon the material in which the threads are being cut.

Obviously screws having structural characteristics differing from those disclosed in the present application, may be employed without departing from the spirit and scope of my present invention, said invention being limited only by the scope of the appended claims.

Having thus described my invention, what I claim as new and desire to secure by Letters Patent is:

1. A tapping screw fastener including a hardened threaded body portion, said body including a section having a cutting edge and a yieldable section for increasing the cutting effectiveness of the edge of said other section, the entering end of the thread decreasing in external diameter.

2. A tapping screw fastener including a hardened threaded body portion, said body including a section having a cutting edge and a yieldable section for increasing the cutting effectiveness of the edge on said other section, the entering end of the thread decreasing in external diameter, and a recessed pilot section extending beyond the entering end of said thread.

3. A tapping screw fastener including a hardened threaded body portion, said body including a section having a cutting edge and a yieldable section for increasing the cutting effectiveness of the edge on said other section, the entering end of the thread decreasing in external diameter, a substantial portion of the thread on said body having a constant root diameter.

In witness whereof, I have hereunto subscribed my name.

GEORGE C. TROTTER.